(12) United States Patent
Scipioni

(10) Patent No.: US 12,106,354 B2
(45) Date of Patent: *Oct. 1, 2024

(54) NO AUTHENTICATION PAYMENT AND SEAMLESS AUTHENTICATION

(71) Applicant: PayPal, Inc., San Jose, CA (US)

(72) Inventor: German Scipioni, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 131 days.

This patent is subject to a terminal disclaimer.

(21) Appl. No.: 17/532,699

(22) Filed: Nov. 22, 2021

(65) Prior Publication Data

US 2022/0084103 A1    Mar. 17, 2022

Related U.S. Application Data

(63) Continuation of application No. 16/364,044, filed on Mar. 25, 2019, now Pat. No. 11,182,842, which is a
(Continued)

(51) Int. Cl.
| | |
|---|---|
| *G06Q 30/00* | (2023.01) |
| *G06F 21/36* | (2013.01) |
| *G06Q 20/02* | (2012.01) |
| *G06Q 20/10* | (2012.01) |
| *G06Q 20/12* | (2012.01) |
| *G06Q 20/32* | (2012.01) |
| *G06Q 20/36* | (2012.01) |

(Continued)

(52) U.S. Cl.
CPC ......... *G06Q 30/0633* (2013.01); *G06F 21/36* (2013.01); *G06Q 20/02* (2013.01); *G06Q 20/102* (2013.01); *G06Q 20/12* (2013.01); *G06Q 20/123* (2013.01); *G06Q 20/32* (2013.01); *G06Q 20/36* (2013.01); *G06Q 20/40* (2013.01); *G06Q 30/0603* (2013.01); *G06Q 30/0611* (2013.01); *G06Q 30/0641* (2013.01)

(58) Field of Classification Search
CPC ....................................................... G06Q 30/00
See application file for complete search history.

(56) References Cited

U.S. PATENT DOCUMENTS

| | | | |
|---|---|---|---|
| 5,960,411 A | 9/1999 | Hartman et al. | |
| 6,873,974 B1 * | 3/2005 | Schutzer | G06Q 20/105 705/40 |

(Continued)

OTHER PUBLICATIONS

Isaacson, Walter, "How to save your newspaper", Time, dated Feb. 2009. (Year: 2009).*

(Continued)

*Primary Examiner* — Mark A Fadok
(74) *Attorney, Agent, or Firm* — .Haynes and Boone, LLP

(57) ABSTRACT

An easy authentication or payment is made by creating an account associated with a particular web browser or device that accesses an on-line page. Payments are made, such as for full-access viewing of an article or viewing content without visible ads, by selecting a payment button on the on-line page. Selection can be with a specific swiping motion or device motion previously defined for the user. Once selected, the payment is made without the user having to authorize or authenticate. The motion can be used independently to authorize or authenticate the user through the device.

19 Claims, 9 Drawing Sheets

Related U.S. Application Data continuation of application No. 14/860,628, filed on Sep. 21, 2015, now Pat. No. 10,242,397, which is a continuation of application No. 12/569,519, filed on Sep. 29, 2009, now Pat. No. 9,147,210.

(60) Provisional application No. 61/229,668, filed on Jul. 29, 2009.

(51) Int. Cl.
*G06Q 20/40* (2012.01)
*G06Q 30/0601* (2023.01)

(56) References Cited

U.S. PATENT DOCUMENTS

| | | | | |
|---|---|---|---|---|
| 8,082,242 | B1* | 12/2011 | Mysen | G06F 16/9562 |
| | | | | 707/711 |
| 9,183,554 | B1* | 11/2015 | Courtright | G06Q 20/4014 |
| 2002/0055907 | A1* | 5/2002 | Pater | G06Q 20/325 |
| | | | | 705/39 |
| 2002/0123965 | A1 | 9/2002 | Phillips | |
| 2003/0149618 | A1 | 8/2003 | Sender et al. | |
| 2004/0122742 | A1 | 6/2004 | Vetelainen | |
| 2004/0139008 | A1 | 7/2004 | Mascavage | |
| 2004/0267688 | A1 | 12/2004 | Vetelainen | |
| 2005/0131765 | A1 | 6/2005 | Rivera et al. | |
| 2006/0168651 | A1 | 7/2006 | Araki et al. | |
| 2007/0042767 | A1* | 2/2007 | Stepanian | G06F 1/1684 |
| | | | | 455/420 |
| 2007/0043614 | A1* | 2/2007 | Daher | G06F 7/08 |
| | | | | 705/14.15 |
| 2008/0088602 | A1 | 4/2008 | Hotelling | |
| 2008/0091619 | A1* | 4/2008 | Perlman | G06Q 20/403 |
| | | | | 705/76 |
| 2008/0140552 | A1* | 6/2008 | Blaikie | G06Q 40/00 |
| | | | | 705/35 |
| 2009/0234751 | A1 | 9/2009 | Chan et al. | |
| 2009/0284482 | A1 | 11/2009 | Chin | |
| 2010/0075666 | A1* | 3/2010 | Garner | H04M 3/387 |
| | | | | 455/41.1 |

OTHER PUBLICATIONS

Garver R., "eBay and Banking: Is PayPal a Serious Rival?", American Banker, 170(220), 10A, Retrieved from URL: https://dialog.proquest.com/professional/docview/1065093673?accountid=131444, 2005, 6 pages.

Gregory D.A., "A Point of Sale Interface Analysis and Design", Dissertations and Theses, Aug. 2000, Retrieved from Internet URL: http://search.proquest.com/docview/304606887?accountid=14753, 9 pages.

Sharma P., "An Evaluation of E-Payment Systems and Their Application in Mobile Commerce", ProQuest Dissertations & Theses Global, Retrieved from Internet URL: https://search.proquest.com/docview/305051358?accountid=14753, 3 pages.

* cited by examiner

Hide advertising for 2 hours: 2¢
Go to Tools > Pennies in Internet Explorer for details Read the rest of this article: 5¢
Go to Tools > Pennies in Internet Explorer for details

NO AUTHENTICATION PAYMENT AND SEAMLESS AUTHENTICATION

CROSS REFERENCE TO RELATED APPLICATIONS

This application is a continuation of U.S. patent application Ser. No. 16/364,044, filed Mar. 25, 2019, which is a continuation of U.S. patent application Ser. No. 14/860,628, filed Sep. 21, 2015, which is a continuation of U.S. patent application Ser. No. 12/569,519, filed Sep. 29, 2009 and issued as U.S. Pat. No. 9,147,210, which claims priority to U.S. Provisional Application No. 61/229,668, filed Jul. 29, 2009, all of which are incorporated herein by reference in their entirety.

BACKGROUND

Field of the Invention

The present invention generally relates to on-line financial transactions and more particularly to making payments with seamless user authentication.

Related Art

In on-line financial transactions, customers search for and purchase products and services through electronic communications with on-line merchants over electronic networks, such as the Internet. During the course of these transactions, customers may provide payment in various ways including, for example, credit cards, electronic fund transfers, and other payment techniques offered by on-line payment providers.

However, on-line payments typically require the user to log into an account or provide some form of authentication before the payment is processed. For example, the user may need to enter an identifier, such as a username or email, and/or a password or PIN. Even after login, the user may need to confirm a payment, such as clicking or selecting a button or icon. This can be tedious, especially with large numbers of payments, where the payment amount is not large.

SUMMARY

Methods and systems of the present disclosure provide a "wallet" or "purse" that is associated with a particular machine, device, or web browser, such as Internet Explorer, where the wallet can be used to make payments for goods or services without the user having to go through several steps to authenticate the payment. In one embodiment, the user creates and pre-funds an account associated with the wallet, through a payment provider, such as PayPal, Inc. of San Jose, CA The amount funded can be a small amount, such as $5, determined by the user or by the payment provider. The funding can be through an account of the user with the payment provider or an outside funding source, such as a bank account or credit card. The user may have multiple wallet-accounts, one for each different machine, device, or browser. Each account is associated with a machine, device, or browser, such as by the user creating the account through the particular machine, device, or browser. The payment provider communicates with the machine, device, or browser, such that when the user logs into the machine, device, or browser, an icon, button, or other indicator of the "wallet" or "purse" appears. In this way, the funds are associated to a particular machine-browser combination (or other such combinations) and thus provides against fraudulent use of the account since the fraudulent party would have to take possession of the machine to "authenticate."

After logging in to the machine, the user, when using the specific device, machine, or browser, can select the icon to make a purchase. The user may indicate the amount of purchase or the purchase amount may be automatically indicated when an item or service is selected. The amount is deducted from the user's specialized account, and payment is made to a merchant, host, or developer. Thus, the user is able to purchase services/items on web sites by leveraging the machine-browser to authenticate with the payment provider. Because the wallet is associated with the machine, device or browser, the machine, device, or browser has its own stored value. This makes minor purchases much easier for the user.

In another embodiment, a unique motion of a mouse, pointer, or device that is associated with a user and device enables the user to be authenticated if the motion matches what is expected. For example, a user may "register" a motion with a system, such as a payment provider. When the user wishes to access the system and/or device, the user performs the motion. The system compares the motion with a stored motion and determines whether the user is the registered user. If so, access is granted. This may also be used to enhance the seamless authentication embodiment above. Other ways to enhance security may include flash-stored objects, browser-based cookies, and hardware/software "fingerprints" (e.g., unique code of the motherboard).

With "authentication" associated with the device or browser and/or seamless authentication using a defined motion, the user is provided with the ability to be authenticated without formal authentication (such as entering a user name and/or password). Both methods, either alone or in combination, thus enable a seamless or non-formal user authentication that still provides security for the user. The security is desirable for the user for many reasons, including the fact that funds that are debited and credited are real funds so that any fraudulent payments may go to many different accounts/merchants and will result in real cash losses for the user. This in contrast with virtual currency, which typically is only usable or has value at a particular merchant site.

These and other features and advantages of the present invention will be more readily apparent from the detailed description of the embodiments set forth below taken in conjunction with the accompanying drawings.

BRIEF DESCRIPTION OF THE FIGURES

FIGS. 7A-7C show one example of utilizing a seamless authentication payment to pay for a service according to one embodiment.

Figure 1:
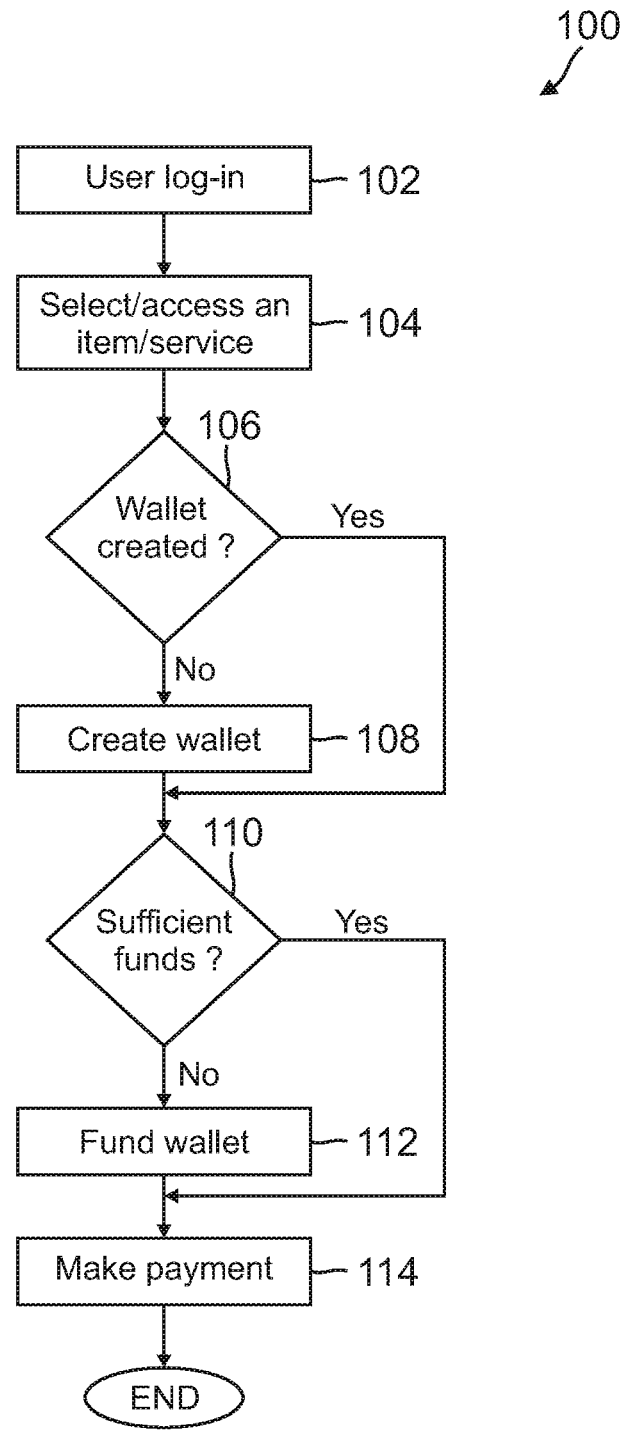
FIG. 1 is a flowchart showing steps to make a seamless authentication payment according to one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

FIG. 1 is a flowchart 100 showing one embodiment of the present disclosure, which enables users to make on-line payments for goods or services without user authentication. At step 102, a customer, consumer, or user first logs into an on-line site on the Internet, such as through a personal computer (PC), a laptop, or a mobile device (e.g., a smart phone). The login process may include the user entering a user name and password onto a computer and opening an Internet browser associated with the computer, unlocking a mobile device with a user name, password, and/or PIN and opening an Internet browser associated with the device, or other known log in methods. The customer can choose to pre-fund the account or select a post-paid account where the owed balance is automatically deducted at a set schedule. The customer then navigates to a desired site and selects or accesses one or more items or services for purchase at step 104. Examples of items may include digital goods, such as virtual cards, virtual greetings, virtual products, game enhancements, and other items of relatively low cost. Examples of services may include viewing an article or content without ads for a certain period of time, viewing a pay-per-view article, access to restricted sites and/or content, and other services of relatively low cost. Selecting or accessing a desired item or service may include clicking on or selecting a link or icon associated with the item or service, which may then indicate the price, or simply accessing or navigating to a desired content, which may then give the user different viewing options related to the content.

Once the user determines the item or service for purchase, the user may make the payment using conventional methods, such as placing the item/service in a cart and going through a check-out process, including entering payment information and authorizing payment. This can be cumbersome and time-consuming. However, if the user has a specialized account with a payment provider that is associated with the Internet browser or device used to access the Internet, the user may pay for the item or service quickly and easily without authorization. First, though, the user must have this specialized account set up, which is determined at step 106. This specialized account may be referred herein to as a "wallet," a "penny jar," or "coin purse."

In one embodiment, the user can determine if a wallet has been created or set up by seeing if an icon or button appears on the on-line site or other indicator, such as upon access or login of the site. If the wallet has not been created or set up with a payment provider, such as PayPal, Inc. of San Jose, CA, the user creates the wallet at step 108. Creating the wallet can be done in many different ways, as long as the wallet or account is associated with a particular user device or Internet/web browser. In one example, the user logs onto the payment provider site and either creates or accesses the user's account from the user's device. The user then creates a wallet account, such as selecting from a drop-down menu, clicking on a link, or selecting an icon. The user may then be asked to enter a device identifier, or the payment provider may simply necessary information from the device and/or Internet browser. The wallet may then be funded through the payment provider site from any acceptable funding source, such as the user's bank account, an account with the payment provider, or a user credit card. The user may specify an amount to be funded, such as $5 or other relatively small amount, or the funding amount may be pre-set by the payment provider at a relatively small amount. Once created, the wallet associated with a particular web browser, such as Windows Internet Explorer, Mozilla Firefox, Apple Safari, Google Chrome, and/or Opera, or device, such as the user's desktop computer, laptop, and/or mobile smart phone. The unique account may also be created through a hardware and/or software characteristics of the user device, alone or in combination with the specific device or browser. Note that the user may have multiple wallets, each associated with a particular browser or device.

Once a wallet is created, a button or icon is added to the user's browser page, such as in a toolbar, which appears when the user accesses a site through the specific browser or through the user's device. For example, Microsoft may add a wallet icon or button as part of the toolbar for its Internet Explorer. Other indicators of the wallet may also be suitable. Along with the icon or button, an amount remaining in the wallet may also be displayed. Thus, each time the wallet is used to make a payment, the amount is updated to reflect a current balance.

After a wallet is created, a determination is made at step 110 whether there are sufficient funds in the wallet to make the selected purchase. Because the current balance is readily visible by the user, the user can easily determine if there are sufficient funds. In another embodiment, the merchant, content provider, payment provider, or other party may make this determination, based on the cost of the selected item or service and the remaining balance in the user's wallet account. If there are insufficient funds, the user funds the wallet at step 112 if the user wishes to proceed with the purchase.

Funding the wallet may be performed in various ways. In one example, the user clicks on a "Tools" button on the tool bar of the web browser. The menu in "Tools" includes a "Pennies," "Wallet," or other name that identifies the wallet. Once selected, a screen may be displayed with information about the wallet, current balance, prior purchases with the wallet, previously selected items/services not yet paid for, and a button to add funds. To add funds, the user may click or select the "Add Funds" button, which may then provide the user with various options for adding funds. This may include the user's bank account, a credit card, or a separate account with the payment provider. Depending on the funding source selected, the user may then enter the requested information, such as account information, user name, password, billing address, or any combination thereof. The user may also select the amount to add, which may be capped at an amount set by the payment provider.

Instead of selecting from a tool bar, the user may also fund the wallet account using a drop-down menu from the wallet icon or button. For example, an arrow may be selected to display the drop-down menu, which may then provide the user different options, including adding funds to the account. Conventional ways of adding funds may then be used, such as described above. In another example of funding the wallet, the user may log into the user's payment provider account, select the wallet account, and add funds through the payment provider site. Again, once the desired wallet account is selected, funds can be added by any suitable method from different funding sources. In another embodiment, the wallet may be set up so that pre-funding is not required or just an initial pre-fund is required. In these cases, the account may be post-paid, with payment triggered by different events, such as maximum amount reached, a time period reached, a combination thereof, or any other desired trigger.

Once there are sufficient funds in the wallet account to make the desired payment, the user makes the payment for the selected item or service at step 114. There may be numerous ways for the user to make the payment, without authentication. In one embodiment, the user simply clicks or taps on the wallet button to make the payment. In another embodiment, the user slides the mouse or a finger across the button to make the payment. These "one-act" methods are easy for the user to quickly make a payment. Once the user performs this affirmative action to make the payment, payment is transferred from the user's wallet account to the appropriate party. The current balance may be updated on the page, and the user can either view the paid-for content or use whatever item or service the user just purchased.

Because the wallet is only funded with a relatively small amount, e.g., $5, fraudulent or unauthorized payment is not a major concern. For example, if the user's device was stolen or otherwise used by an unauthorized user, the unauthorized user may still make payments from the user's device using the wallet account because no authentication is required, other than logging into the device or browser if needed.

Figure 3:
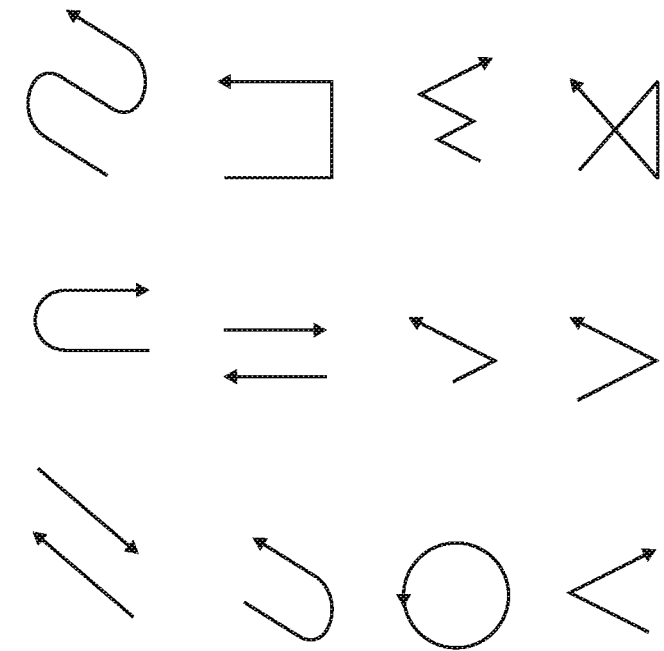
FIG. 3 shows various illustrative and non-exhaustive examples of motions or swipes used to initiate a payment according to one embodiment.
Figure 2:
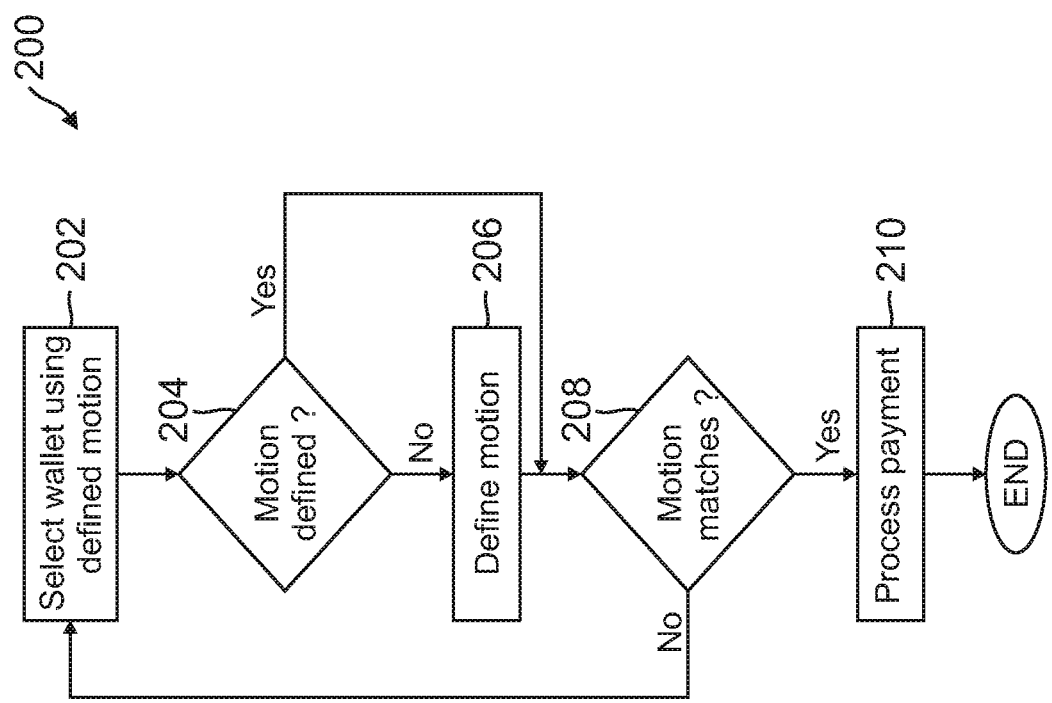
FIG. 2 is a flowchart showing steps to make and confirm a payment for enhancing security of the method in FIG. 1 according to one embodiment.

FIG. 2 is a flowchart showing a method 200 of making a more secure payment according to another embodiment. Instead of simply selecting the wallet payment button, e.g., clicking, tapping, sliding, method 200 requires the user to establish a pattern of selecting the wallet payment button. At step 202, the user selects the wallet payment button using a user-specific motion. Examples of suitable motions across the button include, but are not limited to, an up and down motion, a down and up motion, a circular motion, a zig-zag motion, a serpentine motion, and a check mark motion. In one embodiment, the direction, start and stop points, time between swipes, acceleration of the motion, and/or speed of the motion are also defined, although simply the shape of the motion may be sufficient in some cases. FIG. 3 shows just some of many examples of suitable motions and shapes. The user-defined motion may also be discontinuous, such as a series of clicks or taps on the wallet payment button, with different numbers of clicks or taps and/or different intervals between the clicks or taps.

Once the user selects the wallet using a particular motion, a determination is made, at step 204, whether a motion has previously been defined for the device, user, or web browser. In other words, a motion had to have been already defined before a determination can be made as to whether the user motion in step 202 matches what is expected. If no motion has been defined, the motion is defined at step 206. This may be accomplished in various ways. For example, the motion used at step 202 may be recorded or otherwise stored as the user-defined motion, or the user may be asked to repeat the motion to confirm. If the motion is the same, within tolerances, the motion is recorded or stored. If the motion is not the same, within tolerances, the user may be asked to make the motion again or to start over with a new motion. Thus, the user motion can be defined without leaving the desired page, i.e., it is done on the same page or site as where the user is attempting to make the payment.

For more security, the motion may be defined by requiring the user to define the motion in the payment provider site of the wallet. In this situation, the user logs into the payment provider site, such as entering in a user name and password/PIN, and selecting the desired wallet account. The user then selects an option for creating or defining a user specific motion. The user may be asked to perform the motion one or more times over a sample wallet payment button to define the user motion. Requiring the user to perform the motion more than once enables the system to record variations of the user, such that a more accurate determination can be made when the user performs the motion for payment. In general, the more movements required to define the motion, the more precise or accurate the system can determine when a user performs the proper motion. In one embodiment, the motion definition is on-going rather than a one-time process. For example, each time the user properly performs the motion for payment, the system factors that motion with the stored motion(s) to change the defined motion as needed. This allows any variations from the user, such as due to arthritis, unstable device when performing the motion (such as if the user makes such payments on the move, such as on a plane, in a car, walking, etc.), and any other reasons that may be due the user's personal changes or changes in the user environment.

In addition to motions made on or over a screen, either by a mouse, point, or finger, motions of the device may also be used. For example, there are mobile devices that can detect motions of the device, such as the iPhone by Apple and the Wii by Nintendo. A user may shake or move the device with a certain speed, acceleration, motion, and/or rotation. These attributes may be recorded, as with the screen motion, and used as a way to authenticate or further authenticate a user. With device motions, there may be greater tolerances of acceptable motions, due in part to wider variations of the motion and the precision such motions can be detected by the device and compared by the system.

Once a motion is defined, a determination can be made, at step 208, as to whether the user motion at step 202 matches the defined motion associated with the device, user, or web browser. A match or acceptance may be determined by comparing the user motion with what has been defined. The comparison may be done with standard pattern/motion comparison algorithms, which may factor in tolerated variances. If the motion matches or is acceptable, the payment is processed at step 210, such as by debiting the amount from the user's wallet account and transferring the amount to the merchant, browser, or other third party account. If there is no match, as determined at step 208, the user may be asked to perform the motion again. There may be a limit as to how many times a user may re-try the motion before the session is terminated or the request is finally denied. In some embodiments, the user may be asked for authentication, such as user name and password/PIN, if the motion is not being accepted. This situation may arise if the user has forgotten the motion or is not performing it with the required amount of accuracy. If the user is authenticated using other means, the user may be given an option of adding the motion just attempted (but failed) or adding a new motion to a list of accepted motions or to replace any pre-existing or pre-defined motions.

In another embodiment, authentication through motion can be implemented as a separate form of authentication/payment and does not need to be part of the wallet described above. Used alone, the user may be authenticated or payment authorized using a unique motion that the user defines or chooses. Thus, there is no need for the motion authentication to be part of a wallet, small payment account, or device/browser identification.

Figure 4:
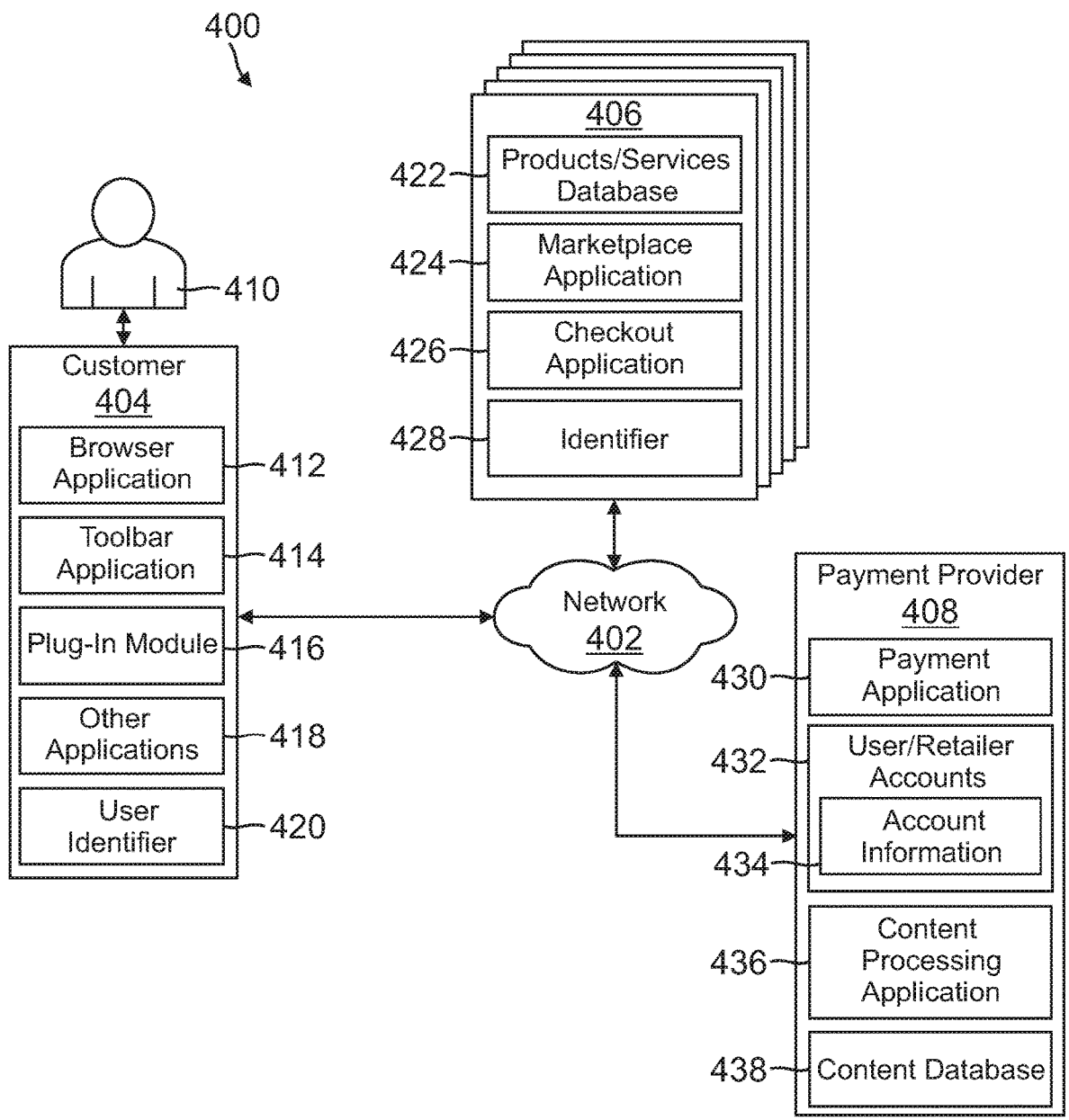
FIG. 4 is a block diagram of a system used for facilitating a no-authentication payment according to one embodiment.

FIG. 4 shows one embodiment of a block diagram of a system 400 configured to perform transactions discussed above over a network 402. As shown in FIG. 4, system 400 includes at least one customer device 404, one or more on-line servers 406, and at least one payment provider server 408 in communication over network 402. Network 402, in one embodiment, may be implemented as a single network or a combination of multiple networks. For example, in various embodiments, network 402 may include the Internet and/or one or more intranets, landline networks, wireless networks, or a wireless telecommunications network (e.g., cellular phone network) adapted to communicate with other communication networks, such as the Internet.

Customer device 404 may be implemented using any appropriate combination of hardware and/or software configured for wired and/or wireless communication over network 402. For example, customer device 404 may be implemented as a personal computer, mobile device such as a cell or smart phone, or a laptop of a customer or user 410 in communication with network 402. Customer device 404 may include one or more browser applications 412 which may be used, for example, to provide a user interface to permit user 410 to browse information available over network 402. For example, browser application 412 may be implemented as a web browser, such as Windows Internet Explorer, Mozilla Firefox, Apple Safari, Google Chrome, and/or Opera, to view information available over the Internet.

Customer device 404 may include one or more toolbar applications 414, which may be used, for example, to provide client-side processing for performing tasks in response to operations selected by user 410. For example, toolbar application 414 may display a graphical user interface (GUI) in connection with browser application 412. Customer device 404 may also include a plug-in module 416 for facilitating financial transactions over network 402. In one implementation, plug-in module 416 comprises a software program, such as a graphical user interface (GUI), executable by a processor that is configured to interface and communicate with the one or more servers 406 and payment provider server 408 via network 402. User 410 is able to access on-line sites via servers 406 to view and select items/content for purchase, and user 410 is able to purchase selected items/content by communicating with the payment provider server 408 via a network browser, such as a web browser.

Customer device 404 may include other applications 418 as may be desired in particular embodiments to provide additional features available to user 410. For example, such other applications 418 may include security applications for implementing customer-side security features, programmatic customer applications for interfacing with appropriate application programming interfaces (APIs) over network 402 or various other types of generally known programs and/or applications.

Customer device 404 may include one or more user identifiers 420, which may be implemented, for example, as operating system registry entries, cookies associated with browser application 412, identifiers associated with hardware of customer device 404, or various other appropriate identifiers. User identifier 420 may include attributes related to the user, such as personal information (e.g., a user name, password, photograph image, biometric id, address, phone number, etc.) and banking information (e.g., banking institution, credit card issuer, user account numbers, security information, etc.). In various implementations, user identifier 420 may be passed with a user purchase request to payment provider server 408, and user identifier 420 may be used by payment provider server 408 to associate user 410 with a particular user account maintained by payment provider server 408.

The one or more servers 406 may be maintained, for example, by one or more merchants or content providers offering various items, such as products, services, and/or content, in exchange for financial payment to be received from users, such as user 410, over network 402. In this regard, each of the one or more servers 406 may include a database 422 for identifying available products, services, and/or content, which may be made available to customer device 404 for viewing and/or purchase by user 410. Accordingly, each of servers 406 may include a marketplace/content application 424, which may be configured to provide information over network 402 to browser application 412 of customer device 404. For example, user 410 may interact with marketplace/content application 424 through browser application 412 over network 402 to search and view various items, content and/or services identified in database 422.

Server 406 may include a checkout application 426, which may be configured to facilitate online purchase transactions by user 410 of products, content, and/or services identified by marketplace application 424. In this regard, checkout application 426 may be configured to accept payment information from user 410 and/or from payment provider server 408 over network 402, such as described above. Server 406 may also include one or more identifiers 428, which may be included as part of the one or more items, services, or content made available for purchase so that particular items, services, or content are associated with particular parties. Identifier 428 may include attributes related to the party, such as business and banking information. In various implementations, identifier 428 may be passed with a user purchase request to payment provider server 408 when user 410 selects an item, service, or content for purchase, and retailer identifier 428 may be used by payment provider server 408 to associate a particular item, service, or content purchased with a particular retailer account maintained by payment provider server 408. Checkout application 426 may also include pattern and motion recognition software to detect and compare a user motion with a defined motion stored with server 406 or with payment provider server 408.

Parties having a related server 406 may need to establish an account with payment provider server 408 so that payment server provider 408 is able to process transactions having items, services, or content offered for purchase by the parties. When establishing an account, the party may need to provide business information, such as name, address, phone number, etc., and financial information, such as banking information, merchant account information, credit card information, payment processing information, etc. Server 406 may be associated with a particular link (e.g., a link, such as a URL (Uniform Resource Locator) to an IP (Internet Protocol) address). In this regard, payment provider server 408 may optionally redirect browser application 412 to an appropriate web page and/or retailer site of server 406 to facilitate purchase of a corresponding item and/or service available from retailer server 406.

Payment provider server 408 may be maintained, for example, by an online payment service provider, which may provide payment processing for online transactions on behalf of user 410 to an operator of server 406. Payment provider server 408 may include one or more payment applications 430, which may be configured to interact with customer device 404 and/or each of servers 406 over network 402 to facilitate the purchase of items, products and/or services by user 410 from server 406. In one example, payment provider server 408 is provided by PayPal, Inc.

Payment provider server 408 may be configured to maintain a plurality of user and retailer/third party accounts 432, each of which may include account information 434 associated with individual users, including user 410, and the one or more on-line retailers/content providers associated with servers 406. For example, account information 434 may include private financial information of user 410 and third parties, such as one or more account numbers, passwords, credit card information, banking information, or other types of financial information, which may be used to facilitate online transactions between user 410 of the customer device 404 and one or more retailers/content providers associated with servers 406. As such, payment application 430 may be configured to interact with the one or more servers 406 on behalf of user 410 during a transaction with checkout application 426 without requiring user 410 to provide account information 434 directly to server 406. Payment provider server 408 may also include a content processing application 436, which may select content from a content database 438 to be provided to user 402. Content processing application 436 may provide appropriate rules-based or heuristics-based facilities for selecting appropriate content for user 402 based on, for example, user identifier 420, user account 432, user account information 434, information received from server 406, or other characteristics. Content processing application 436 may also include pattern and motion recognition software to detect and compare a user motion with a defined motion stored with server 406 or with payment provider server 408

Payment provider server 408, through payment application 430, user/retailer accounts 432, content processing application 436, and content database 438, may provide the no-authentication payment with or without a user-defined motion, as described above. For example, payment provider server 408, based on communication with server 406 and customer device 404, detects a transaction from a specific user device or web browser and processes a payment with a user acknowledgement, such as a swipe across a wallet payment button.

Figure 5:
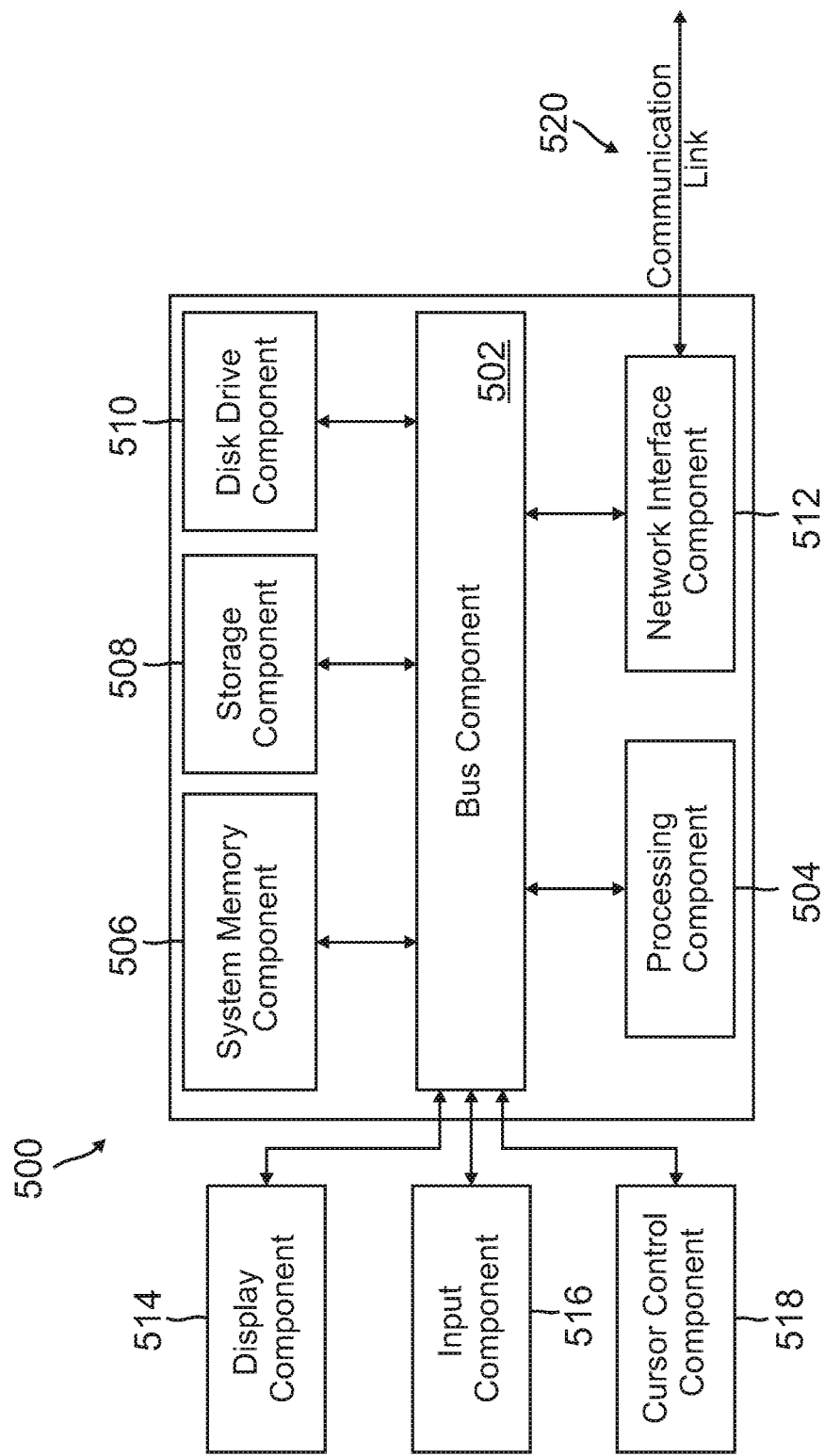
FIG. 5 is a block diagram of one embodiment of a system that can be used to implement one or more components of the system in FIG. 4.

FIG. 5 is a block diagram of a computer system 500 according to one embodiment, which may be suitable for implementing embodiments of various aspects of this disclosure, including, for example, user device 404, server 406 and/or payment provider server 408. In various implementations of various embodiments, user device 404 may comprise a personal computing device, such as a personal computer, laptop, PDA, cellular phone or other personal computing or communications devices. Server 406 and/or payment provider server 408 may comprise a network computing device, such as one or more servers, computer or processor combined to provide the payment services. Thus, it should be appreciated that user device 404, server 406, and/or payment provider server 408 may be implemented as computer system 500 in a manner as follows.

In one embodiment, computer system 500 may include a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT, touch-screen, or LCD), an input component 516 (e.g., keyboard or keypad), and/or a cursor control component 518 (e.g., mouse or trackball). In one embodiment, disk drive component 510 may comprise a database having one or more disk drive components.

Computer system 500 may perform specific operations by processor 504 executing one or more sequences of one or more instructions contained in system memory component 506, according to steps described above with respect to FIGS. 1 and 2. Such instructions may be read into system memory component 506 from another computer readable medium, such as static storage component 508 or disk drive component 510. The various storage or memory components may be used to store the user's defined motion or pattern. In other embodiments, hard-wired circuitry may be used in place of or in combination with software instructions to implement the invention.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 500. In various other embodiments, a plurality of computer systems 500 coupled by communication link 520 (e.g., network 110 of FIG. 1, LAN, WLAN, PTSN, or various other wired or wireless networks) may perform instruction sequences to practice the invention in coordination with one another.

Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 6A:
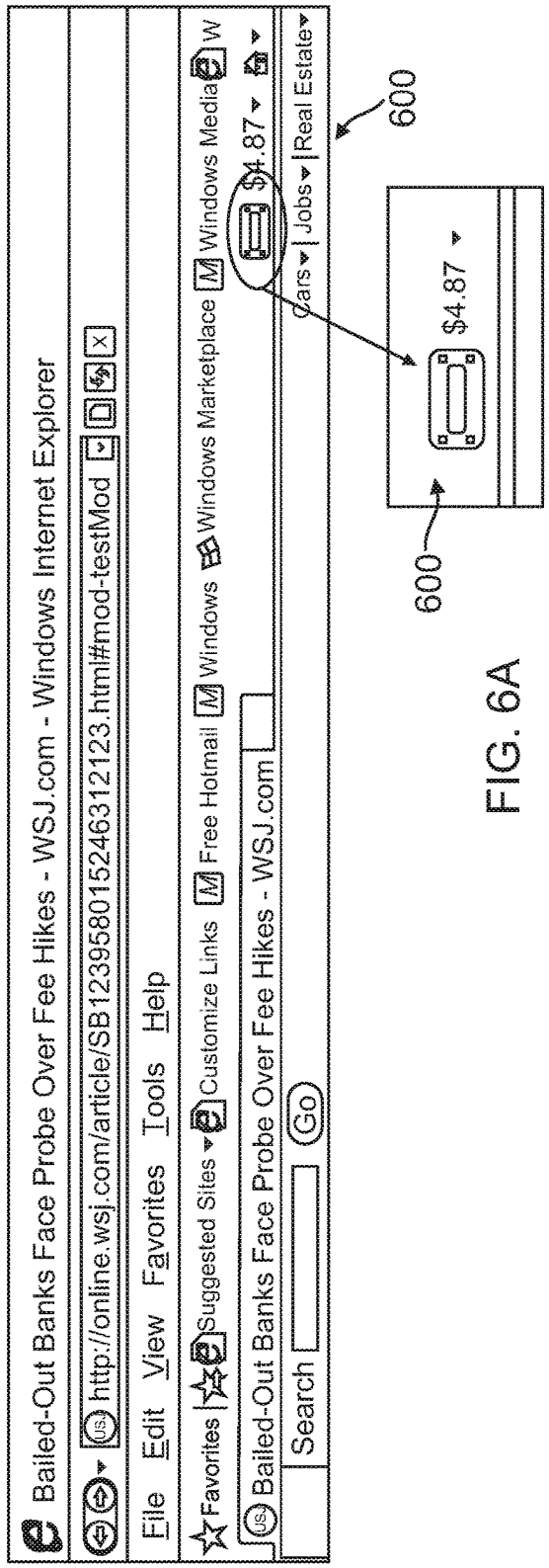
FIGS. 6A-6D show partial screen shots showing various images presented to the user in a seamless authentication payment, according to one embodiment.
Figure 6B:
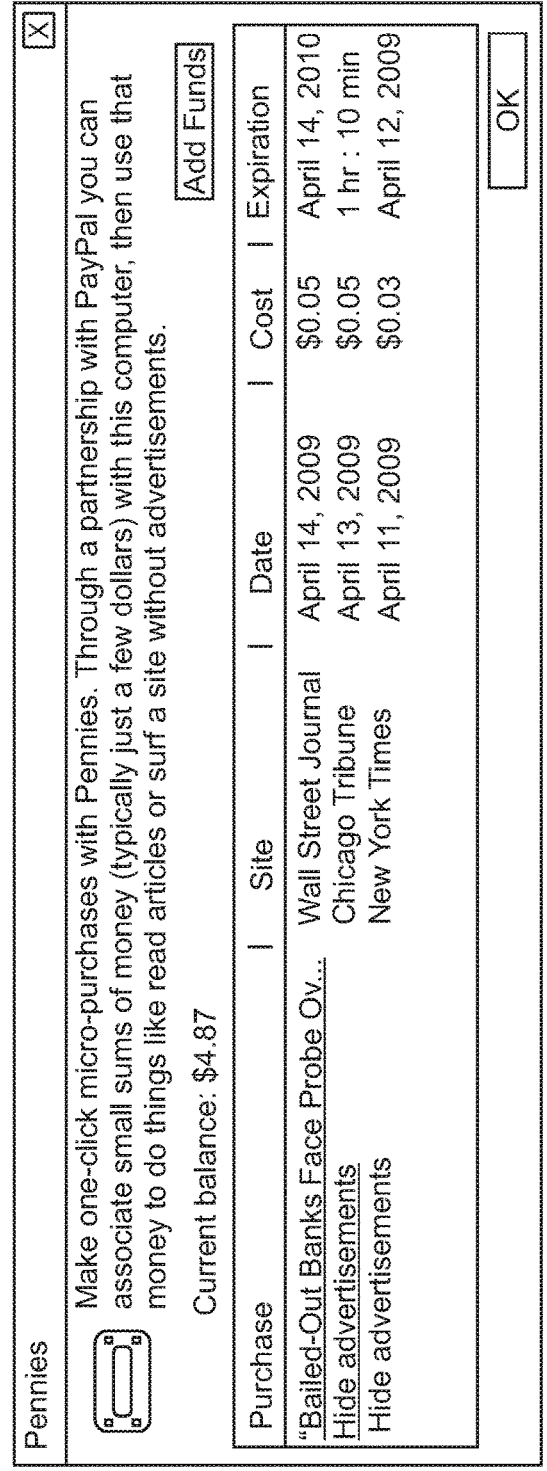
Figure 6C:
Figure 6D:

FIGS. 6A-6D are exemplary partial screen shots showing various images presented to the user a no-authentication payment, according to one embodiment of the invention. FIG. 6A shows a tool bar having a wallet 600, where wallet 600 appears when the specific web browser associated with the wallet account is opened. Note that other representations of the wallet may be suitable as well. FIG. 6B shows a screen that is displayed when the user selects the wallet from a "Tools" menu or from a drop-down screen associated with wallet 600. The screen provides details of the wallet, a list of purchases or potential purchases, and a button to add funds to the wallet. FIGS. 6C and 6D show wallet payment buttons for improved content viewing. FIG. 6C shows an example of making a small payment, in this case 2¢, so that the user can view content without ads for a specified period of time, in this case two hours. The ads may be "removed" by various methods, including reducing the font size so small that they are invisible to the reader and essentially removed or deleted, although the content is still there. FIG. 6D shows an example of making a small payment, in this case 5¢, so that the user can view the entire article without having to subscribe to the site or service.

Figure 7A:
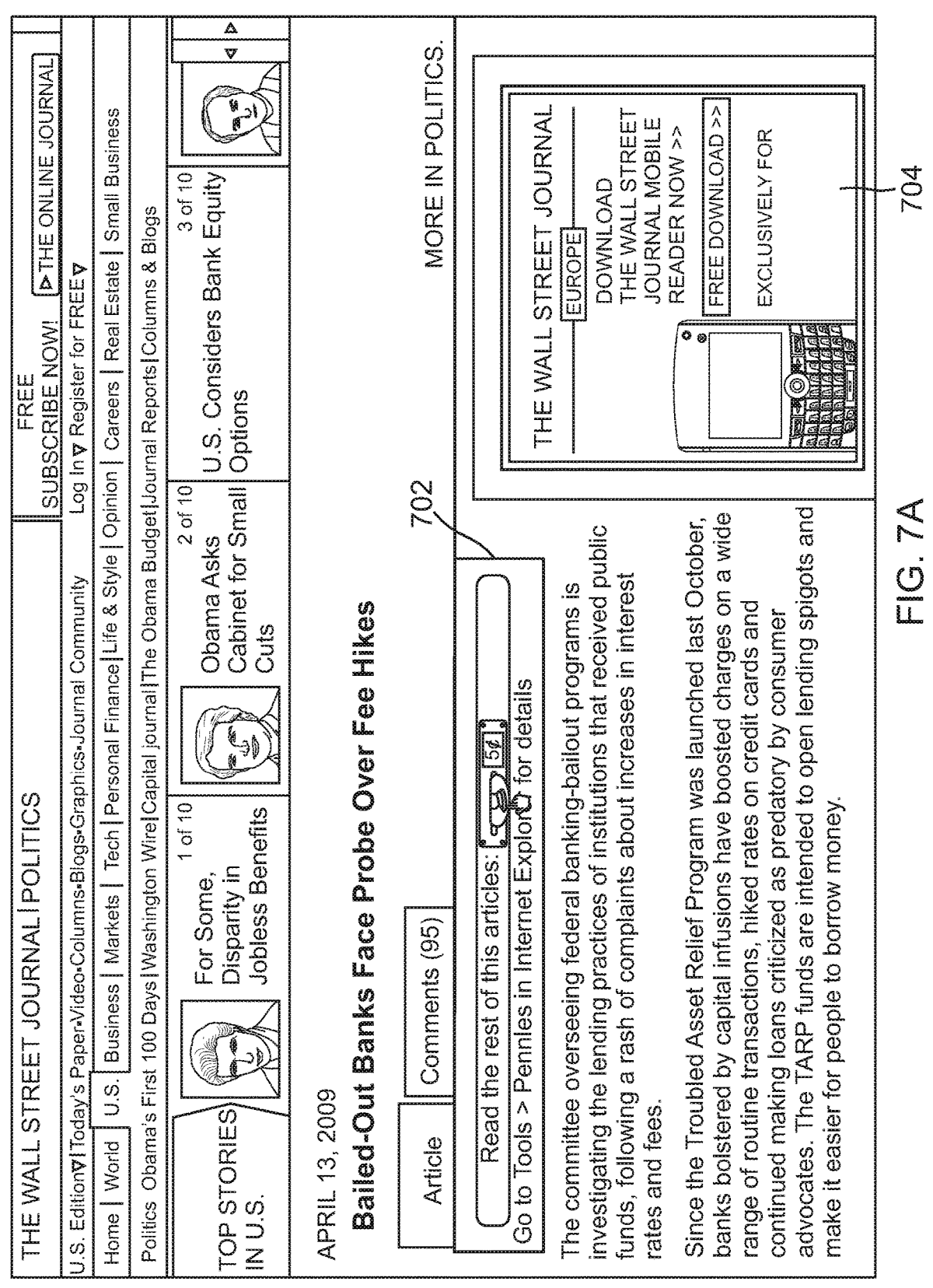
Figure 7B:
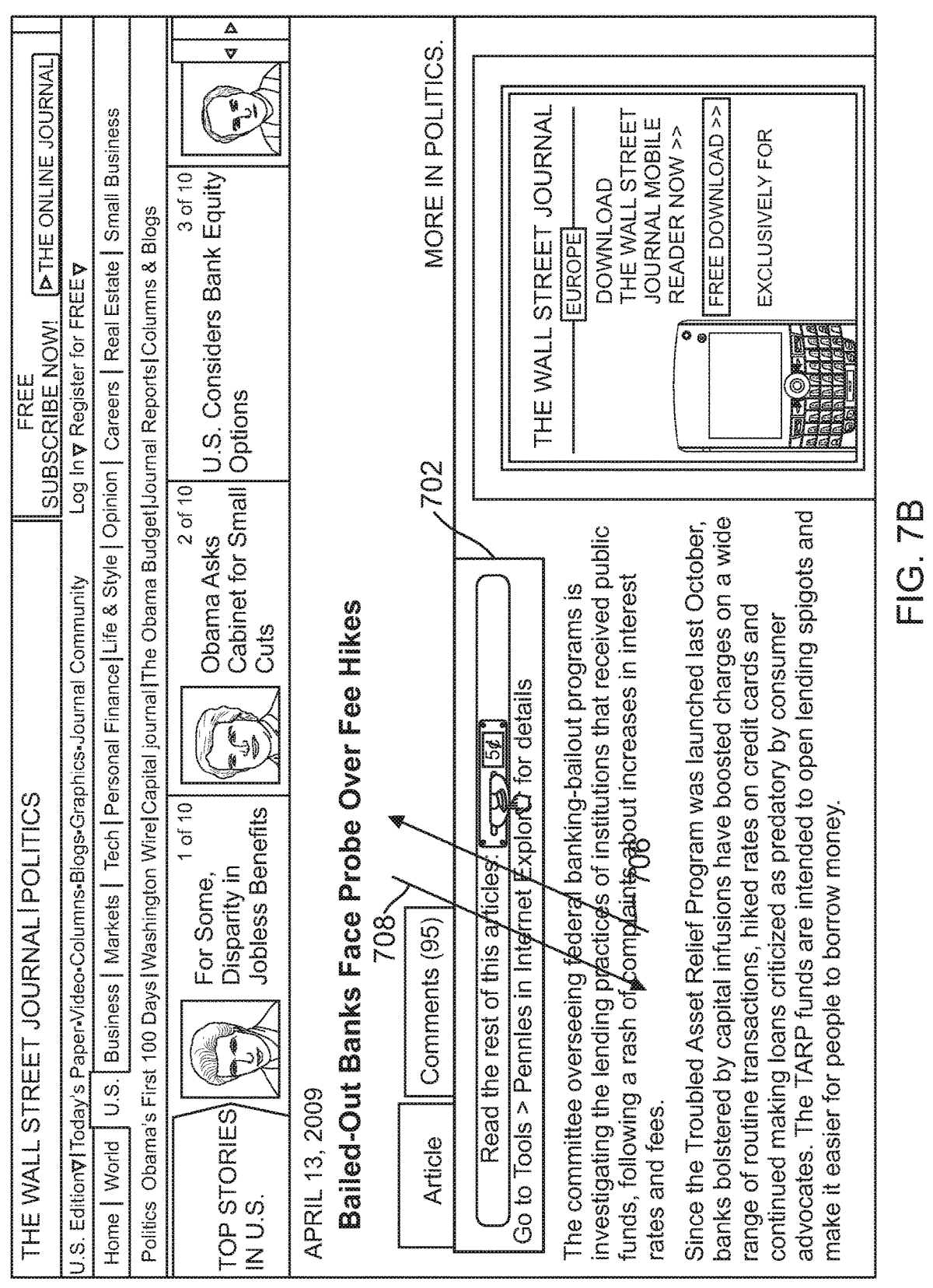
Figure 7C:
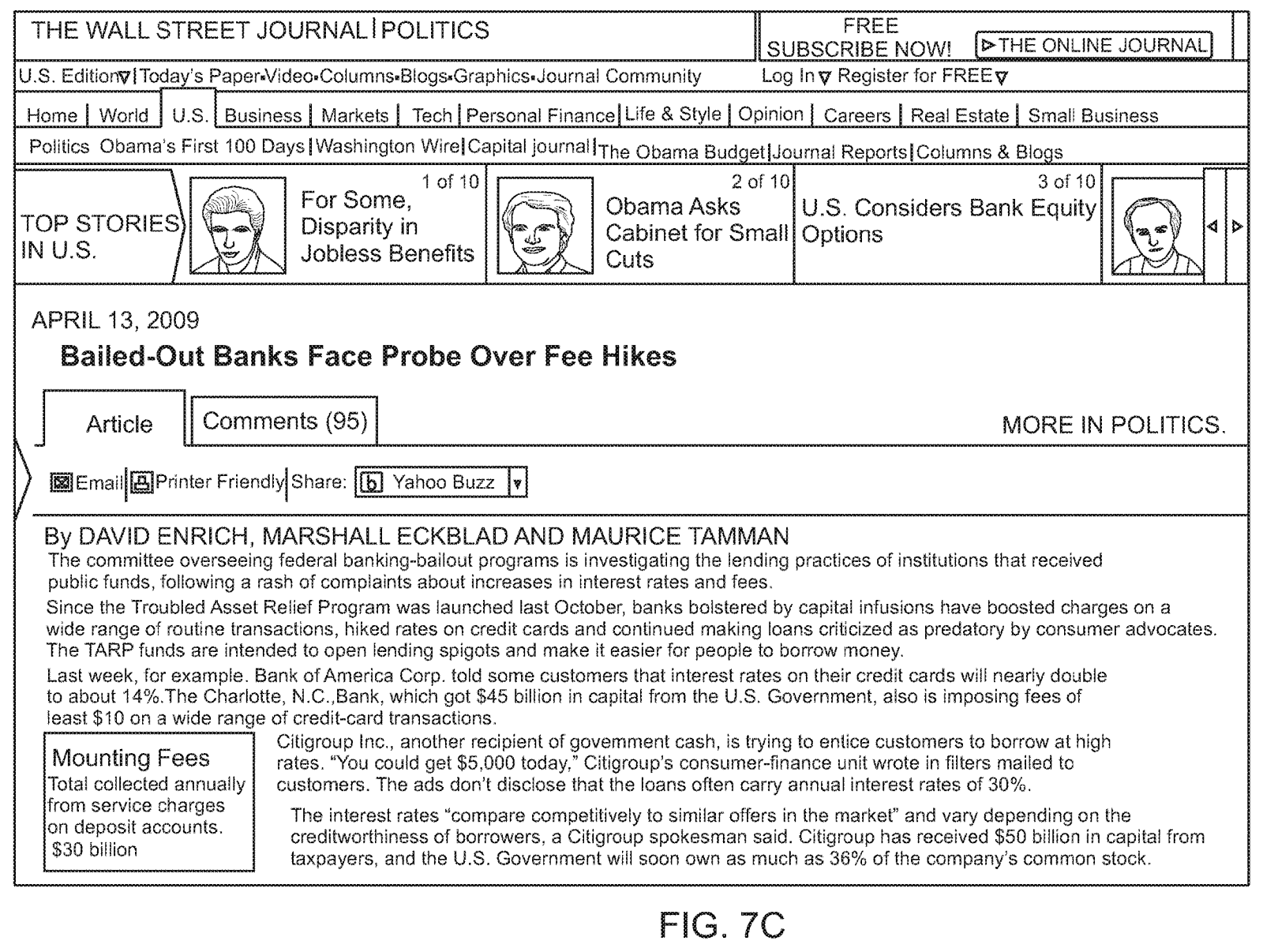

FIGS. 7A-7C show one example of utilizing a no-authentication payment to pay for a service according to one embodiment. FIG. 7A shows a partial screen shot when a user with a wallet account navigates to a desired web page through a web browser. The desired web page is from The Wall Street Journal and displays an article from The Wall Street Journal. Because the user has a wallet account associated with the particular web browser or user device, a wallet button 702 appears on the screen. Also on the screen is an advertisement 704 that occupies a significant portion of the screen. For 5¢, the user can view the article or content without any ads. This may be valuable to the user for a number of reasons, including a more enjoyable reading experience, less distractions with ads, and more content on screen. The latter reason may be especially valuable with small screens, such as portable devices like smart phones.

FIG. 7B shows one example for making a payment to remove ads. If the user decides to make the payment, the user moves a mouse, the user's finger, or other means over wallet button 702 in a defined motion. In this example, the user first makes a swiping up motion 706 from below wallet button 702 to above wallet button 702. The user then makes a swiping down motion 708 to the left of the first swipe, from above wallet button 702 to below wallet button 702. If the motions match what is expected from the user/device, such as determined by the payment provider, the desired amount (e.g., 5¢) is deducted from the user's wallet account with the payment provider and credited to the web browser or content provider.

FIG. 7C shows an "ad-free" page, showing just the content of the article after the user makes the payment. The user thus sees much more content on the page, and the entire article may be read with less scrolling through a page. This is possible without the user having to separately authenticate a payment, which can be inconvenient and time-consuming, and without the user having to "click" (since swipes are used). "Clicking" may be undesirable due to the noise it makes, which can bring attention to the user in quiet environments or other circumstances where the user does not want the "click" to be heard.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus, the invention is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   determining digital wallet information for a digital wallet associated with a user;
   determining, based on the digital wallet information and a device identifier for the system, a limited stored value available via an application on the system;
   displaying a graphical icon within the application, the graphical icon providing an indication that purchases are available on the application via the digital wallet for the limited stored value;
   receiving an input that interacts with the graphical icon via a user motion from a plurality of user motions associated with different limited stored values;
   determining that the input is within a tolerance for the user motion based on a plurality of past inputs of the user motion;
   determining that the input requests executing an electronic transaction processing operation for an electronic transaction with a website based on the graphical icon, the user motion, and the input being within the tolerance, wherein the user motion for the input authorizes a use of the limited stored value for the electronic transaction;
   transmitting an electronic transaction processing request for the electronic transaction with an identifier associated with the digital wallet to an online transaction processor;
   receiving, from the online transaction processor, a transaction processing result from the electronic transaction processing request; and
   recording the input with the plurality of past inputs for variations of the user motion corresponding to the tolerance.

2. The system of claim 1, wherein the operations further comprise:
   determining transaction data for the electronic transaction with the website based on the received input; and
   determining, based on the transaction data, that the electronic transaction does not exceed an amount for the limited stored value made available by the digital wallet, wherein the electronic transaction processing request for the electronic transaction is transmitted to the online transaction processor in response to determining that the electronic transaction does not exceed the amount for the limited stored value made available by the digital wallet.

3. The system of claim 1, wherein the electronic transaction processing request for the electronic transaction is transmitted to the online transaction processor without an authentication of the user.

4. The system of claim 1, wherein the operations further comprise displaying the digital wallet information within the graphical icon, the digital wallet information including an amount of funds available in the digital wallet.

5. The system of claim 1, wherein the operations further comprise:
generating, using an online service provider, the digital wallet using an account of the user, wherein the generating the digital wallet comprises:
authenticating the user via a log in to the account; and
requesting an establishment of the digital wallet based on a funding amount associated with the account.

6. The system of claim 5, wherein the digital wallet is generated based on an identifier for one of a device operated by the user or an application running on the device, and wherein the identifier is received in response to requesting the establishment of the digital wallet.

7. The system of claim 1, wherein the input comprises the user motion made via an input component of a device operated by the user, and wherein the user motion comprises a movement of the input in at least one direction.

8. The system of claim 7, wherein the input component is one of a touchpad device, a pointer device, or a touchscreen device.

9. The system of claim 8, wherein the motion made via the input component is compared to a set of predetermined motions, each of the set of predetermined motions being associated with a transaction action on the website.

10. A method comprising:
determining digital wallet information for a digital wallet associated with a user;
determining, based on the digital wallet information and an identifier associated with a device of the user, a limited stored value available via a browser application on the device;
displaying a graphical icon within the browser application, the graphical icon providing an indication that purchases are available on the browser application via the digital wallet for the limited stored value;
populating the graphical icon with information indicating an availability of funds for electronic transaction processing on a website;
receiving an input that includes at least a selection of the graphical icon via an input motion from a set of predetermined motions associated with different limited stored values;
determining that the input is within an allowable tolerance for the input motion based on a plurality of past inputs associated with the input motion;
authenticating the user based on the input motion;
determining that the input requests executing an electronic transaction processing operation for an electronic transaction with the website based on the graphical icon, the input motion, and the input being within the allowable tolerance;
transmitting an electronic transaction processing request for the electronic transaction with an identifier associated with the digital wallet to an online transaction processor; and
receiving, from the online transaction processor, a transaction processing result from the electronic transaction processing request.

11. The method of claim 10, wherein the authenticating the user comprises:
comparing the input motion to a set of predetermined motions,
wherein the determining that the input motion is within the acceptable tolerance is further based on the comparing.

12. The method of claim 11, wherein each of the set of predetermined motions is associated with a transaction action on the website.

13. The method of claim 10, further comprising:
determining transaction data for the electronic transaction with the website based on the received input; and
determining, based on the transaction data, that the electronic transaction does not exceed an amount for the limited stored value made available by the digital wallet,
wherein the electronic transaction processing request for the electronic transaction is transmitted to the online transaction processor in response to determining that the electronic transaction does not exceed the amount for the limited stored value made available by the digital wallet.

14. The method of claim 10, wherein the input motion comprises a motion made via an input component of the device, and wherein the input component is one of a touchpad device, a pointer device, or a touchscreen device.

15. A non-transitory machine-readable medium having stored thereon machine-readable instructions executable to cause a machine to perform operations comprising:
determining digital wallet information for a digital wallet associated with a user;
determining, based on the digital wallet information and a device identifier for the machine, a limited stored value available via an application on the machine;
displaying a graphical icon within the application, the graphical icon providing an indication that purchases are available on the application via the digital wallet for the limited stored value;
receiving an input that interacts with the graphical icon via a user motion from a plurality of user motions associated with different limited stored values;
determining that the input is within a tolerance for the user motion based on a plurality of past inputs of the user motion;
determining that the input requests executing an electronic transaction processing operation for an electronic transaction based on the graphical icon, the user motion, and the input being within the tolerance, wherein the user motion for the input authenticates a use of the limited stored value for the electronic transaction;
transmitting an electronic transaction processing request for the electronic transaction with an identifier associated with the digital wallet to an online transaction processor; and
receiving, from the online transaction processor, a transaction processing result from the electronic transaction processing request.

16. The non-transitory machine-readable medium of claim 15, wherein the operations further comprise:
- determining transaction data for the electronic transaction based on the received input; and
- determining, based on the transaction data, that the electronic transaction does not exceed an amount for the limited stored value made available by the digital wallet,
- wherein the electronic transaction processing request for the electronic transaction is transmitted to the online transaction processor in response to determining that the electronic transaction does not exceed the amount for the limited stored value made available by the digital wallet.

17. The non-transitory machine-readable medium of claim 15, wherein the operations further comprise providing for display the digital wallet information within the graphical icon, the digital wallet information including an amount of funds available in the digital wallet.

18. The non-transitory machine-readable medium of claim 15, wherein the operations further comprise:
- generating, using an online service provider, the digital wallet using an account of the user, wherein the generating the digital wallet comprises:
  - authenticating the user via a log in to the account; and
  - requesting an establishment of the digital wallet based on a funding amount associated with the account.

19. The non-transitory machine-readable medium of claim 18, wherein the digital wallet is generated based on an identifier for one of a device operated by the user or an application running on the device, and wherein the identifier is received in response to requesting the establishment of the digital wallet.

* * * * *